Figure 1:
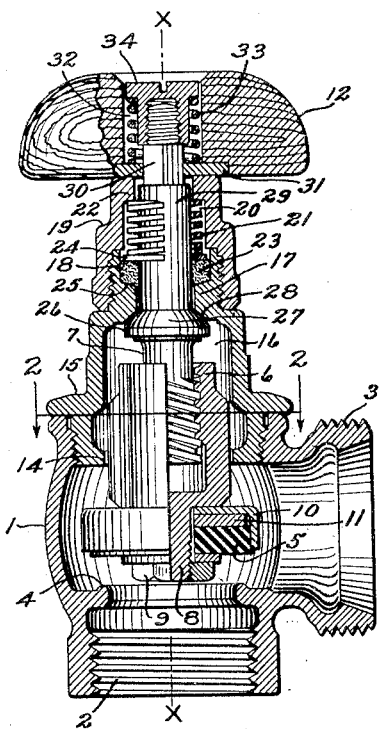

Feb. 9, 1932.      E. J. KILEY      1,844,399
VALVE
Filed Oct. 18, 1929

Witness:
H. J. Stromberger

Inventor
EDWARD J. KILEY
By
Attorney

Patented Feb. 9, 1932

1,844,399

UNITED STATES PATENT OFFICE

EDWARD J. KILEY, OF MANSFIELD, OHIO, ASSIGNOR TO THE OHIO BRASS COMPANY, OF MANSFIELD, OHIO, A CORPORATION OF NEW JERSEY

VALVE

Application filed October 18, 1929. Serial No. 400,543.

My invention relates to valves of the packless type adapted for use in controlling fluids.

It is the object of my invention to provide a valve which possesses sufficient novel packing means to prevent leakage around the stem and be simple in construction. My invention resides in the new and novel construction, combination and relation of the various parts hereinafter described and shown in the accompanying drawings.

In the drawings:—

Figure 2:
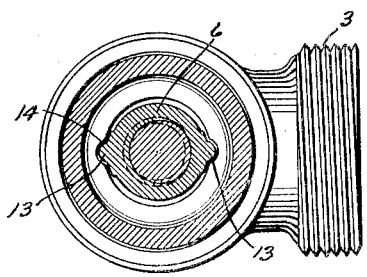

Fig. 1 is a partial, longitudinal section of my invention and Fig. 2 is a transverse section on the line 2—2 of Fig. 1.

My preferred embodiment comprises a body member 1 having a female threaded portion 2 and male threaded portion 3 to which the piping may be connected. An annular seat 4 is provided to be engaged by a packing disc 5, preferably of non-metallic composition.

The valve member or disc 5 is mounted upon a movable stem 6, which in turn is mounted in threaded engagement upon a rotatable-non-reciprocal stem 7. Secured to the stem 6 is a projection 8 provided with a nut 9 and a cup 10. The cup is mounted on the portion 8 with the composition disc 5 inserted therein and a stiffening plate 11 inserted therebetween, and the nut 9 is then applied with a washer thereon which draws the various parts described into position and holds them in fixed relation. The plate 11 may be made heavy and the member 10 of light material and the member 11 will distribute the strain uniformly over the disc 5.

The interior of the stem 6 and the exterior of the lower end of the stem 7 are provided with interengaging threads such that when the handle 12 is rotated in the usual direction for closing the valve, the member 6 will be moved downwardly and the member 5 into contact with the seat 4. The member 6 is provided with two projections or wings 13 which slidably engage in grooves 14 in the bonnet 15. The interlocking of the wings and grooves 13 and 14 prevent rotation of the member 6 but permits it to move longitudinally of the valve.

The bonnet 15 is detachably secured to the body by means of threaded engagement and is provided with a recess 16, the inwardly projecting flange 17 and a packing recess 18. Threadably mounted upon the bonnet 15 is a cap 19 provided with a spring chamber 20 and on which is mounted a spring 21 which engages an inwardly projecting flange 22 and with yieldable packing 23 or, if desired, a washer 24 may be inserted between the spring 21 and the packing 23. The spring holds the packing against the seat 25 in the bonnet.

The stem 7 is provided with an annular flange 26 having a curved seat portion 27 engaging with a seat 28 on the bonnet. The stem 7 is also provided with a portion 29 which passes through the opening in the flange 17 and is guided thereby and projects into the spring chamber 20 and through the spring 21.

Adjacent the upper end of the stem 7 is a portion 30 provided with a plurality of sides to receive the handle 12 which is provided with a metal washer 31 fixedly secured to the handle 12 and having a polygonal sided opening to receive and engage the portion 30 of the stem 7 in non-rotatable relation. The washer 31 will rest upon the upper end of the cap 19. The handle 12 is provided with a spring recess 32 in which is positioned the spring 33 and held in compressed relation by means of the screw nut 34 having a threaded relation with the end of the stem 7.

It will be evident that with the spring 33 under compression, it will push down on the plate 31 and up on the nut 34, thereby tending to raise the stem 7 and bring the seat 27 in engagement with the seat 28 and hold the plate 31 in contact with the cap 19, and it will further be evident that any downward pressure on the handle 12 will be transmitted to the cap 19 and not to the stem 7 which is slidably longitudinal with respect to the plate 31.

With the spring 21 under compression it will bear upwardly against the flange 22 and downwardly against the packing 18, thus tending to compress the yieldable packing 18 around the stem 7 and against the seat 25.

Rotation of the handle 12 in the proper direction will cause the stem 6 to be moved downwardly to close the valve and the rotation of the handle in the opposite direction will cause the stem 6 to be raised to open the valve, and in either case the stem 7 merely rotates without moving axially or longitudinally of the valve body but may move relative to the valve body, bonnet, cap and handle due to any wear which may take place between the seats 27 and 28.

Having described my invention, I claim:—

1. A valve comprising a body having two openings and a closing mechanism to engage a seat within the body to prevent flow from one opening to the other, the closing mechanism comprising a threaded socket portion having a seating member secured thereto to engage the seat and also having wings on the said socket portion to prevent rotation of the closing mechanism but permitting longitudinal movement when opening and closing the valve, a bonnet threadably engaging the body and having a pocket communicating with the body openings and having means cooperating with the said wings, a seat on the bonnet within the pocket, an oppositely disposed seat on the bonnet to the other seat thereon, a cap threadably secured to the bonnet and having a pocket therein, openings in the bonnet and cap axially alined and a stem through the openings and extending interiorly of the bonnet and exteriorly of the cap, the stem provided with a projecting seat engaging the first mentioned seat on the bonnet and having a threaded engagement with the socket portion to raise and lower same, a spring mounted within the cap pocket, yieldable packing in the said pocket and pressed against the seat therein on the bonnet by the spring therein, a handle mounted on the exterior end of the stem in slidable but non-rotatable relation thereto and engaging the exposed end of the cap, a recess in the handle, a spring in the recess supported by the handle and a nut threadably mounted on the stem within the handle recess and placing the spring under tension to hold the handle against the cap and seat on the stem against the seat on the bonnet.

2. A valve comprising a hollow body having openings thereto and a seat therein, a bonnet secured thereto having a seat therein and an oppositely disposed seat thereon and an interposed opening, a cap secured to the bonnet and forming therewith a recess and having an inwardly projecting flange with an opening therein in alinement with the first opening, a stem mounted in the bonnet and cap and extending through the openings and recess and having a flange seat engaging the seat within the bonnet, yieldable packing within the said recess engaging the seat therein on the bonnet and a tension spring within the recess pressing upon the packing therein and bearing against said flange, a handle mounted on the exposed end of the stem in slidable and non-rotatable relation thereto and engaging the exposed end of the cap, a recess within the handle and a nut mounted on the stem within the handle and a spring mounted within the handle recess and supported between the handle and nut biased to move the handle and nut in opposite directions, an auxiliary stem socketed on the stem in threaded relation thereto and having means cooperating with means on the bonnet to permit slidable but non-rotatable relation between the bonnet and auxiliary stem, and means on the auxiliary stem to engage the body seat to close the valve.

3. A valve comprising a recessed body having openings thereto and a seat therein between the openings, a bonnet secured thereto and a cap secured on the bonnet, alined openings through the bonnet and cap, a recess formed by the cap and bonnet and a recess in the bonnet separated from the first recess by a flange, a stem mounted in the openings and having a seat within the bonnet recess, a seat on the bonnet within the bonnet recess engaged by the stem seat therein, a seat within the bonnet-cap recess surrounding the stem and having a yielding packing on said seat and a spring pressing the packing against the seat, a recessed handle mounted on the stem in slidable and non-rotatable relation and a spring within the handle recess biased to move the handle against the cap and the seat on the stem against the seat within the bonnet recess, and means on one end of the stem and movable into and out of engagement with the body seat to close and open the valve when the stem is rotated.

4. A valve comprising a recessed body having openings thereto and a seat therein between the openings, a super-structure mounted on the body and having a continuous passage therethrough, a flange surrounding the passage and formed on the interior of the super-structure and providing two seats, a stem mounted within and projecting from the passage at both ends and having a seat to engage one of the seats on the super-structure a recess surrounding the stem and within which one seat faces, non-rotatable means on one end of the stem to engage the body seat to close the valve, a handle secured to the other end of the stem in slidable and non-rotatable relation thereto and a spring within the handle and cooperating with the handle and stem to hold the handle in engagement with the super-structure and the co-operating seats on the stem and super-structure in engagement, and a yieldable packing in the recess surrounding the stem, a spring holding the packing against the seat therein.

5. A valve comprising a recessed body having communicating openings therewith, a seat within the body between the openings, a reciprocal-non-rotatable stem having means thereon to engage the body seat to close the valve, a non-reciprocal-rotatable stem to reciprocate the first said stem and having a seat thereon, a super-structure mounted on the body to support the stem in axial relation thereto and having a seat, a handle supported by the super-structure against movement in an axial direction towards the body seat and secured to the stem in slidable and non-rotatable relation, the seat on the stem in engagement with the seat on the super-structure and a spring co-operating with the handle and the stem to urge the latter two seats into tight engagement, a recess in the super-structure surrounding the stem, a yielding packing in the recess surrounding the stem and a spring pressing the packing into intimate contact with the stem and super-structure.

6. A valve having a casing and inlet and outlet openings, three relatively fixed seats on the casing, a stem having a rotatable part mounted in the casing and a non-rotatable part movable longitudinally when the first said part is rotated, the non-rotatable part having a valve member thereon to engage one of the casing-seats to close the valve and the rotatable part having a seat engaging another of the casing-seats, yieldable packing engaging the third casing-seat, a handle mounted on the stem in longitudinally movable and non-rotatable relation thereto and non-movable longitudinally of the casing in one direction, a spring urging the seat on the said rotatable part and its casing-seat into closer engagement and yieldably holding the handle against longitudinal movement relative to the casing in the opposite direction, a spring engaging the yieldable packing and urging it against its casing-seat.

In testimony whereof I affix my signature.

EDWARD J. KILEY.